US011405547B2

(12) United States Patent
Park et al.

(10) Patent No.: US 11,405,547 B2
(45) Date of Patent: Aug. 2, 2022

(54) METHOD AND APPARATUS FOR GENERATING ALL-IN-FOCUS IMAGE USING MULTI-FOCUS IMAGE

(71) Applicant: Electronics and Telecommunications Research Institute, Daejeon (KR)

(72) Inventors: Seong-Jin Park, Seoul (KR); Do-Hyung Kim, Sejong-si (KR); Jae-Woo Kim, Daejeon (KR); Seong-Jun Bae, Daejeon (KR); Ho-Wook Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 296 days.

(21) Appl. No.: 16/723,759

(22) Filed: Dec. 20, 2019

(65) Prior Publication Data

US 2020/0252545 A1    Aug. 6, 2020

(30) Foreign Application Priority Data

Feb. 1, 2019  (KR) ........................ 10-2019-0013947
Apr. 12, 2019  (KR) ........................ 10-2019-0042858

(51) Int. Cl.
*H04N 5/232*  (2006.01)
*G06N 3/08*  (2006.01)
*G06T 5/50*  (2006.01)

(52) U.S. Cl.
CPC ........... *H04N 5/23229* (2013.01); *G06N 3/08* (2013.01); *G06T 5/50* (2013.01); *H04N 5/23212* (2013.01);
(Continued)

(58) Field of Classification Search
CPC ........... H04N 5/23229; H04N 5/23212; H04N 5/232133; H04N 5/2356; H04N 5/232123; H04N 5/2226; H04N 5/2258; H04N 5/232125; H04N 5/23232; H04N 5/2621; G06N 3/08; G06N 3/0454; G06T 5/50; G06T 5/002; G06T 5/003;
(Continued)

(56) References Cited

U.S. PATENT DOCUMENTS 6,344,930 B1 *  2/2002  Kaneko ............ H04N 5/232123
                                                                  359/666
8,638,987 B2     1/2014  Choi et al.
(Continued)

FOREIGN PATENT DOCUMENTS

CN      106846463 A     6/2017
WO      2018218643 A1  12/2018

OTHER PUBLICATIONS

Keita Takahashi et al., "All in-Focus View Synthesis from Under-Sampled Light Fields," ICAT 2003, Dec. 3-5, Tokyo, Japan.

*Primary Examiner* — Michael S Osinski
(74) *Attorney, Agent, or Firm* — William Park & Associates Ltd.

(57) ABSTRACT

Disclosed herein is a method for operating an apparatus for generating an all-in-focus image. The method may include generating a focus-map-calculating model through deep learning for images having different focuses and a reference all-in-focus image corresponding thereto, calculating a focus map for each of multi-focus images, which are captured by a camera, using the focus-map-calculating model, and generating an all-in-focus image for the multi-focus images using the focus map.

19 Claims, 7 Drawing Sheets

(52) U.S. Cl.
CPC ............... *G06T 2207/10052* (2013.01); *G06T 2207/20081* (2013.01)

(58) Field of Classification Search
CPC . G06T 2207/10028; G06T 2207/10052; G06T 2207/10016; G06T 2207/10148; G06T 2207/20221; G06T 2207/20081–20084; G06T 2200/21; G06T 7/571; G06T 7/11
See application file for complete search history.

(56) References Cited

U.S. PATENT DOCUMENTS

| | | | |
|---|---|---|---|
| 9,143,678 B2 | 9/2015 | Park et al. | |
| 9,292,926 B1* | 3/2016 | Tang | H04N 5/23222 |
| 9,307,154 B2* | 4/2016 | Yamada | G06T 3/40 |
| 10,255,693 B2* | 4/2019 | Smith | G06K 9/6267 |
| 2006/0204121 A1* | 9/2006 | Bryll | G06T 7/0004 |
| | | | 382/255 |
| 2009/0310885 A1* | 12/2009 | Tamaru | H04N 5/2356 |
| | | | 382/275 |
| 2010/0149363 A1* | 6/2010 | Inomata | G02B 21/367 |
| | | | 348/222.1 |
| 2012/0057040 A1* | 3/2012 | Park | H04N 5/23229 |
| | | | 348/222.1 |
| 2012/0113227 A1* | 5/2012 | Paik | H04N 9/0451 |
| | | | 348/46 |
| 2012/0148109 A1* | 6/2012 | Kawamura | G02B 7/38 |
| | | | 382/106 |
| 2012/0301025 A1* | 11/2012 | Peng | G06T 5/50 |
| | | | 382/167 |
| 2013/0101177 A1* | 4/2013 | Yamada | G06T 7/571 |
| | | | 382/107 |
| 2014/0320730 A1* | 10/2014 | Kim | G02B 7/38 |
| | | | 348/345 |
| 2015/0002724 A1* | 1/2015 | Chuang | H04N 5/23212 |
| | | | 348/346 |
| 2015/0035855 A1* | 2/2015 | Kim | H04N 5/23212 |
| | | | 345/619 |
| 2015/0062370 A1* | 3/2015 | Shroff | H04N 5/232133 |
| | | | 348/222.1 |
| 2015/0116353 A1* | 4/2015 | Miura | G06F 3/04845 |
| | | | 345/632 |
| 2015/0163406 A1* | 6/2015 | Laroia | H04N 5/23212 |
| | | | 348/208.1 |
| 2015/0326798 A1* | 11/2015 | Muto | G06T 7/30 |
| | | | 348/239 |
| 2015/0350526 A1* | 12/2015 | Toyoda | H04N 5/23261 |
| | | | 348/349 |
| 2015/0358542 A1* | 12/2015 | Sato | H04N 5/2258 |
| | | | 348/239 |
| 2016/0104291 A1* | 4/2016 | Zhou | H04N 5/23212 |
| | | | 382/173 |
| 2016/0309141 A1* | 10/2016 | Pulli | H04N 5/2226 |
| 2016/0360091 A1* | 12/2016 | Lindskog | G02B 27/0075 |
| 2017/0053456 A1 | 2/2017 | Cho et al. | |
| 2017/0262993 A1* | 9/2017 | Uchiyama | H04N 13/207 |
| 2017/0374269 A1* | 12/2017 | Govindarao | G01B 11/245 |
| 2018/0104009 A1* | 4/2018 | Abhari | A61B 34/10 |
| 2018/0253877 A1* | 9/2018 | Kozub | G06T 5/50 |
| 2018/0322660 A1* | 11/2018 | Smith | G06K 9/6267 |
| 2019/0318822 A1* | 10/2019 | Zhang | G06K 9/00147 |
| 2020/0043197 A1* | 2/2020 | Bazin | G06T 7/80 |
| 2020/0090005 A1* | 3/2020 | Ghosh | G06N 3/08 |
| 2020/0151860 A1* | 5/2020 | Safdarnejad | G06K 9/00268 |
| 2020/0184637 A1* | 6/2020 | El-Zehiry | G06K 9/628 |
| 2020/0294254 A1* | 9/2020 | KV | G06T 5/002 |
| 2021/0073953 A1* | 3/2021 | Lee | G06N 3/0454 |
| 2021/0073959 A1* | 3/2021 | Elmalem | G06N 3/0454 |
| 2021/0089816 A1* | 3/2021 | Amon | G06T 7/143 |
| 2021/0103770 A1* | 4/2021 | van Baar | G06K 9/629 |
| 2021/0166360 A1* | 6/2021 | Kim | G06F 17/11 |
| 2021/0183089 A1* | 6/2021 | Wadhwa | G06K 9/00664 |
| 2021/0327051 A1* | 10/2021 | Jia | G06K 9/00 |

* cited by examiner

METHOD AND APPARATUS FOR GENERATING ALL-IN-FOCUS IMAGE USING MULTI-FOCUS IMAGE

CROSS REFERENCE TO RELATED APPLICATIONS

This application claims the benefit of Korean Patent Application No. 10-2019-0013947, filed Feb. 1, 2019, and No. 10-2019-0042858, filed Apr. 12, 2019, which are hereby incorporated by reference in their entireties into this application.

BACKGROUND OF THE INVENTION

1. Technical Field

The present invention relates to an apparatus for generating an all-in-focus image using multi-focus images and a method of operating the apparatus.

2. Description of the Related Art

Generally, when a user takes a picture, the user focuses on a desired object such that the object is in focus and thus clear. Here, the part that is focused on is clearly shown, but the other parts are out of focus and look blurry. However, users may want to obtain a picture with everything in focus. Particularly, in order to generate an all-in-focus image from a plenoptic image, a focal stack including refocused images having different depths is generated, the degree of focus is calculated for each image in the focal stack, and the refocused image having the sharpest focus is found for each pixel, whereby an all-in-focus image may be generated.

Documents of Related Art (Patent Document 1) U.S. Pat. No. 9,143,678, published on Sep. 22, 2015 and titled "Apparatus and method for processing light field data using a mask with an attenuation pattern"
(Patent Document 2) Chinese Patent Application Publication No. CN106846463, published on Jun. 13, 2017 and titled "Deep-learning-neural-network-based microscopic image three-dimensional reconstruction method and system"
(Patent Document 3) International Patent Application Publication No. WO2018-218643, published on Dec. 6, 2018 and titled "Method and apparatus for estimating depth of field information".

SUMMARY OF THE INVENTION

An object of the present invention is to provide an apparatus for generating an all-in-focus image and a method for operating the same, which are configured to acquire multi-focus images by capturing images at the same position such that the images have different focuses, to generate a focus map, which relates to the degree of focus in each focus image, based on deep learning using the relationship between the multi-focus images, and to finally generate an all-in-focus image based on the focus map.

The technical objects of the present invention are not limited to the above technical object, and other technical objects that are not mentioned will be readily understood by a person of ordinary skill in the art from the following description.

A method for operating an apparatus for generating an all-in-focus image according to an embodiment of the present invention may include generating a focus-map-calculating model through deep learning for images having different focuses and a reference all-in-focus image corresponding thereto; calculating a focus map for each of multi-focus images, captured by a camera, using the focus-map-calculating model; and generating the all-in-focus image for the multi-focus images using the focus map.

According to an embodiment, the method may further include reading the multi-focus images and the reference all-in-focus image from a database.

According to an embodiment, the camera may include a plenoptic camera.

According to an embodiment, the reference all-in-focus image may be generated using the images having the difference focuses.

According to an embodiment, the focus-map-calculating model may be used to generate respective focus maps corresponding to multiple focuses.

According to an embodiment, generating the all-in-focus image may include generating the all-in-focus image from the multi-focus images using the focus maps corresponding to the multiple focuses.

According to an embedment, the method may further include calculating an error difference between the all-in-focus image and the reference all-in-focus image.

According to an embodiment, the method may further include updating a weight of the focus-map-calculating model depending on the error difference.

According to an embodiment, generating the all-in-focus image may further include generating a weight that is proportional to a focus value based on a focus map of each of the multi-focus images; and calculating an average of respective weights of the multi-focus images in order to acquire a color value of a pixel in the all-in-focus image.

An apparatus for generating an all-in-focus image according to an embodiment of the present invention may include at least one processor and memory for storing at least one instruction executed by the at least one processor. The at least one instruction may be executed by the at least one processor so as to calculate a focus map for each of multi-focus images, which are captured by a camera, using a focus-map-calculating model and to generate the all-in-focus image for the multi-focus images using the focus map.

According to an embodiment, the at least one instruction may be executed by the at least one processor so as to generate the focus-map-calculating model through deep learning for images having different focuses and a reference all-in-focus image corresponding thereto.

According to an embodiment, the deep learning may include a convolutional neural network (CNN).

According to an embodiment, the multi-focus images may be acquired in such a way that the camera at a same position captures images by focusing on various objects or depths.

According to an embodiment, the focus-map-calculating model may be used to generate a focus map corresponding to each of the multi-focus images.

According to an embodiment, the all-in-focus image may be generated using an average of weights for focus map values corresponding to the multi-focus images.

According to an embodiment, the focus-map-calculating model may be trained such that a difference between the all-in-focus image and the reference all-in-focus image is minimized.

According to an embodiment, the deep learning may be implemented by combining a convolution layer, a batch normalization layer, and a activation layer.

An electronic device according to an embodiment of the present invention may include a plenoptic camera; a database for storing an image set comprising images having different focuses and a reference all-in-focus image corresponding thereto; and an all-in-focus image generation apparatus for reading the image set from the database, generating a focus-map-calculating model through deep learning for the read image set, and generating an all-in-focus image for multi-focus images, captured by the plenoptic camera, using the focus-map-calculating model.

According to an embodiment, the all-in-focus image generation apparatus may generate a focus map for each of the multi-focus images, generate weights, each of which is proportional to a focus value, based on the generated focus map, and calculate an average of the generated weights as a color value of a pixel, thereby generating the all-in-focus image.

According to an embodiment, in the database, the all-in-focus image generation apparatus may train the focus-map-calculating model using the reference all-in-focus image and the multi-focus images corresponding to the all-in-focus image.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms. These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, the terms used herein are used merely to describe specific embodiments, and are not intended to limit the present invention. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Figure 1:
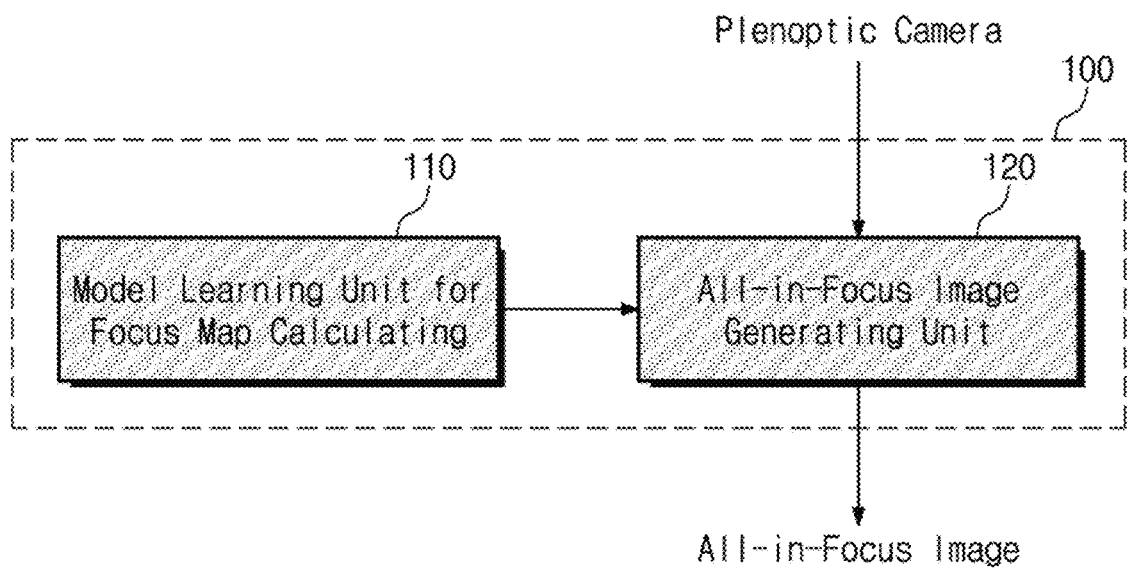
FIG. 1 is an exemplary view that shows an apparatus for generating an all-in-focus image according to an embodiment of the present invention.

FIG. 1 is an exemplary view that shows an apparatus 100 for generating an all-in-focus image according to an embodiment of the present invention. Referring to FIG. 1, the apparatus 100 for generating an all-in-focus image may include a model-learning unit 110 for focus map calculation and an all-in-focus-image-generating unit 120.

The model-learning unit 110 may be implemented so as to generate a focus-map-calculating model through training. In an embodiment, the model-learning unit 110 may perform training using any of various methods. For example, training may include deep learning. Deep learning may correspond to Convolutional Neural Networks (CNN), Recurrent Neural Networks (RNN), Deep Belief Networks, Restricted Boltzmann Machines, or the like. Hereinafter, deep learning is described as corresponding to a Convolutional Neural Network (CNN), but the present invention should be understood as not being limited thereto.

In an embodiment, the model-learning unit 110 may calculate a focus map by generating and training a focus map model based on a convolutional neural network of deep learning. In an embodiment, in order to train the focus map model, a database in which an image set comprising multi-focus images and a clear image corresponding thereto is configured may be constructed.

The all-in-focus-image-generating unit 120 may be implemented so as to generate an all-in-focus image from multi-focus images using a focus-map-calculating model. The all-in-focus-image-generating unit 120 may acquire multi-focus images by capturing images so as to have different focuses, generate a focus map, which relates to the degree of focus in each focus image, using the relationship between the multi-focus images based on deep learning, and finally generate an all-in-focus image based on the focus map.

Meanwhile, the model-learning unit 110 and the all-in-focus-image-generating unit 120 shown in FIG. 1 may be implemented using hardware, software, or firmware.

The apparatus 100 for generating an all-in-focus image according to an embodiment of the present invention may output a clear all-in-focus image using the focus-map-calculating model.

A conventional all-in-focus image generation apparatus configures a focal stack by generating refocused images from a plenoptic image and calculates a focus map, which relates to the degree of focus in each image, based on the images in the focal stack. However, the apparatus 100 for generating an all-in-focus image according to an embodiment of the present invention applies deep learning in order to calculate a focus map rather than calculating the focus map based on images, thereby improving the accuracy of generation of clear images.

Figure 2:
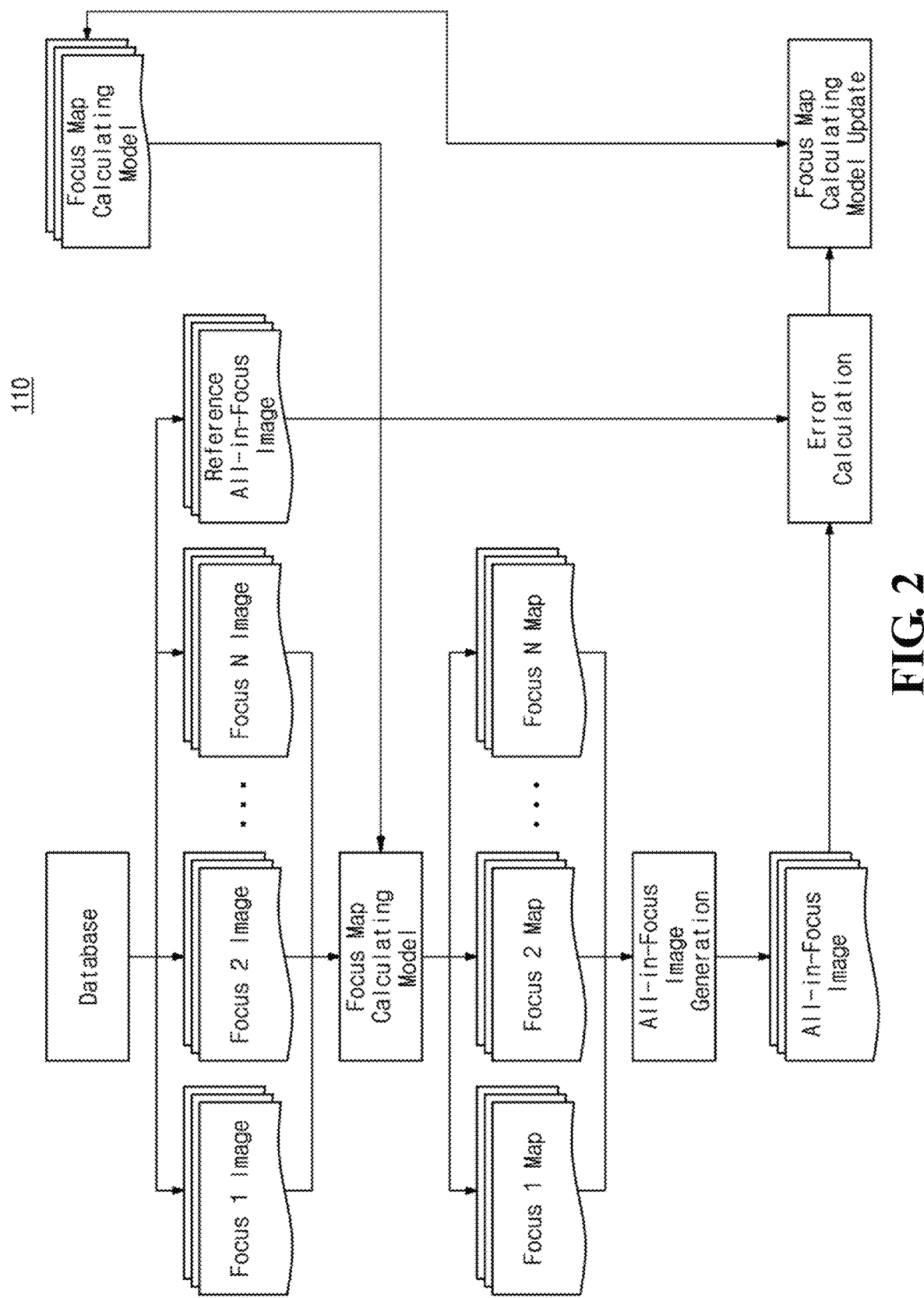
FIG. 2 is an exemplary view that shows the operation of a model-learning unit for focus map calculation according to an embodiment of the present invention.

FIG. 2 is an exemplary view that shows the operation of a model-learning unit 110 for focus map calculation according to an embodiment of the present invention. Referring to FIG. 2, the model-learning unit 110 for focus map calculation may receive an image set comprising multi-focus images and a reference all-in-focus image corresponding thereto. The image set comprising the multi-focus images and the clear reference all-in-focus image may be used to generate a focus-map-calculating model in an existing database.

In an embodiment, the model-learning unit 110 for focus map calculation may train the focus-map-calculating model using a reference all-in-focus image and multi-focus images corresponding thereto in a learning database, which is generated by storing captured images. Here, the model-learning unit 110 for focus map calculation may train the focus-map-calculating model based on deep learning such that the focus map acquired through the focus-map-calculating model satisfies the minimum difference between the estimated all-in-focus image, which is finally acquired through Equation (1), and the reference all-in-focus image acquired from the database.

$$I(x,y) = \sum_{i=1}^{N} w_i(x,y) \cdot F_i(x,y) \quad (1)$$

Here, $I(x, y)$ denotes an all-in-focused pixel color value of coordinate $(x, y)$ (a pixel color value at coordinates $(x, y)$ on an all-in-focus image), $w_i(x, y)$ denotes the focus value at coordinates $(x, y)$ on the i-th focus map, and $F_i(x, y)$ denotes a pixel color value at coordinates $(x, y)$ on the i-th focus image.

In an embodiment, the focus-map-calculating model may be generated using a convolutional neural network model based on deep learning. Here, the convolutional neural network model may include a convolution layer, a batch normalization layer, and an activation layer. In an embodiment, in order to generate an optimum all-in-focus image, these three layers may be variously combined and used for training the model. In the last layer of the focus-map-calculating model, the focus value may be adjusted as shown in Equation (3) such that a focus value in the form of a weight is finally output, that is, such that Equation (2) is satisfied.

$$\sum_{i=1}^{N} w_i(x, y) = 1 \quad (2)$$

$$w_n(x, y) = \frac{l_n^{last}(x, y)}{\sum_{i=1}^{N} l_i^{last}(x, y)} \quad (3)$$

Here, $l_i^{last}(x,Y)$ denotes the result value of the last layer of the convolutional neural network for the i-th focus image.

Figure 3:
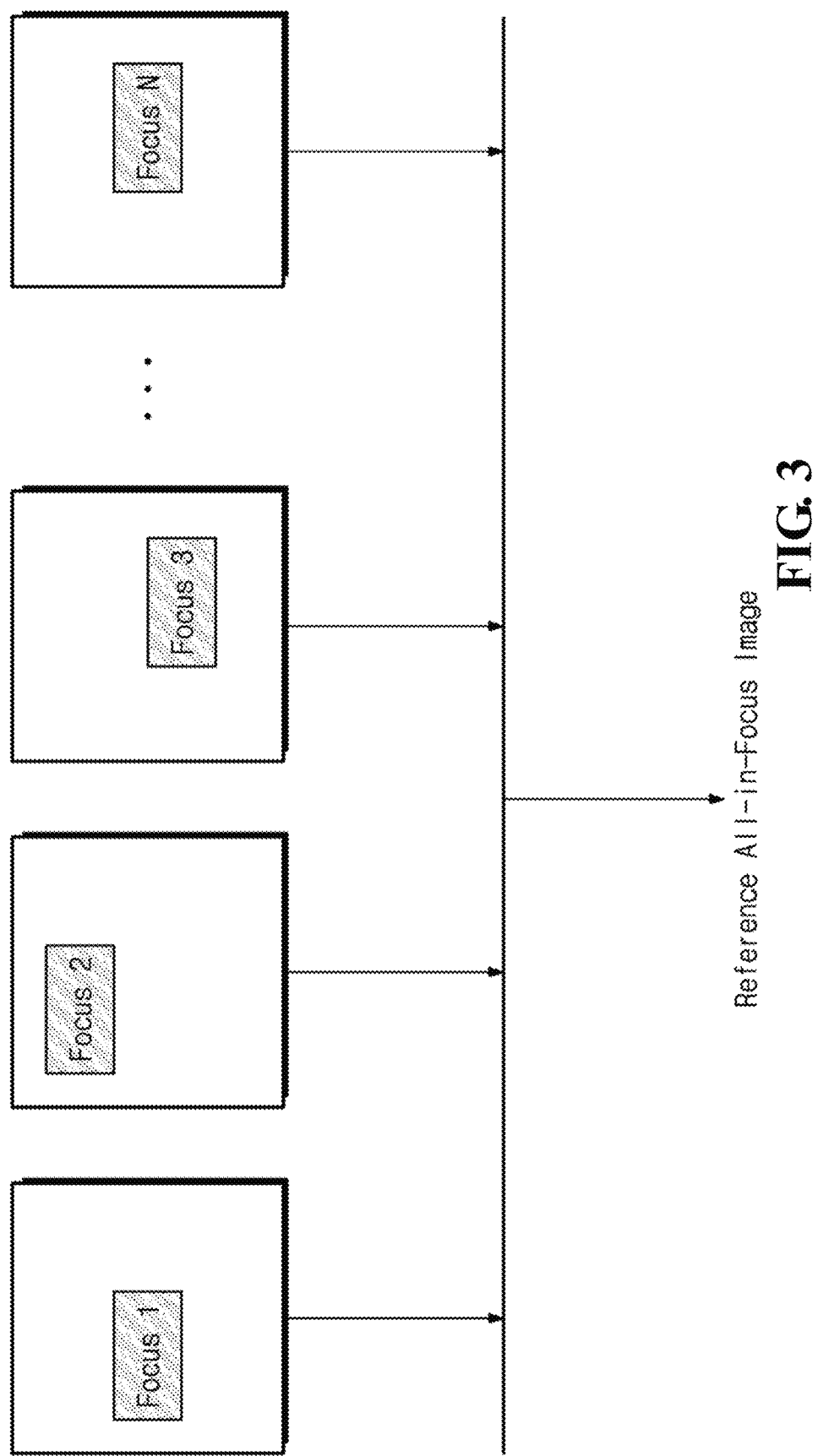
FIG. 3 is an exemplary view that shows the process of acquiring an image set for multi-focus images and a reference all-in-focus image according to an embodiment of the present invention.

FIG. 3 is an exemplary view that shows the process of acquiring an image set for multi-focus images and a reference all-in-focus image according to an embodiment of the present invention. Referring to FIG. 3, an image set may be acquired from images having different focuses. For example, a single all-in-focus image may be generated by combining multi-focus images, among different images of an object. The multi-focus images and the reference all-in-focus image corresponding thereto may be stored in a database.

Figure 4:
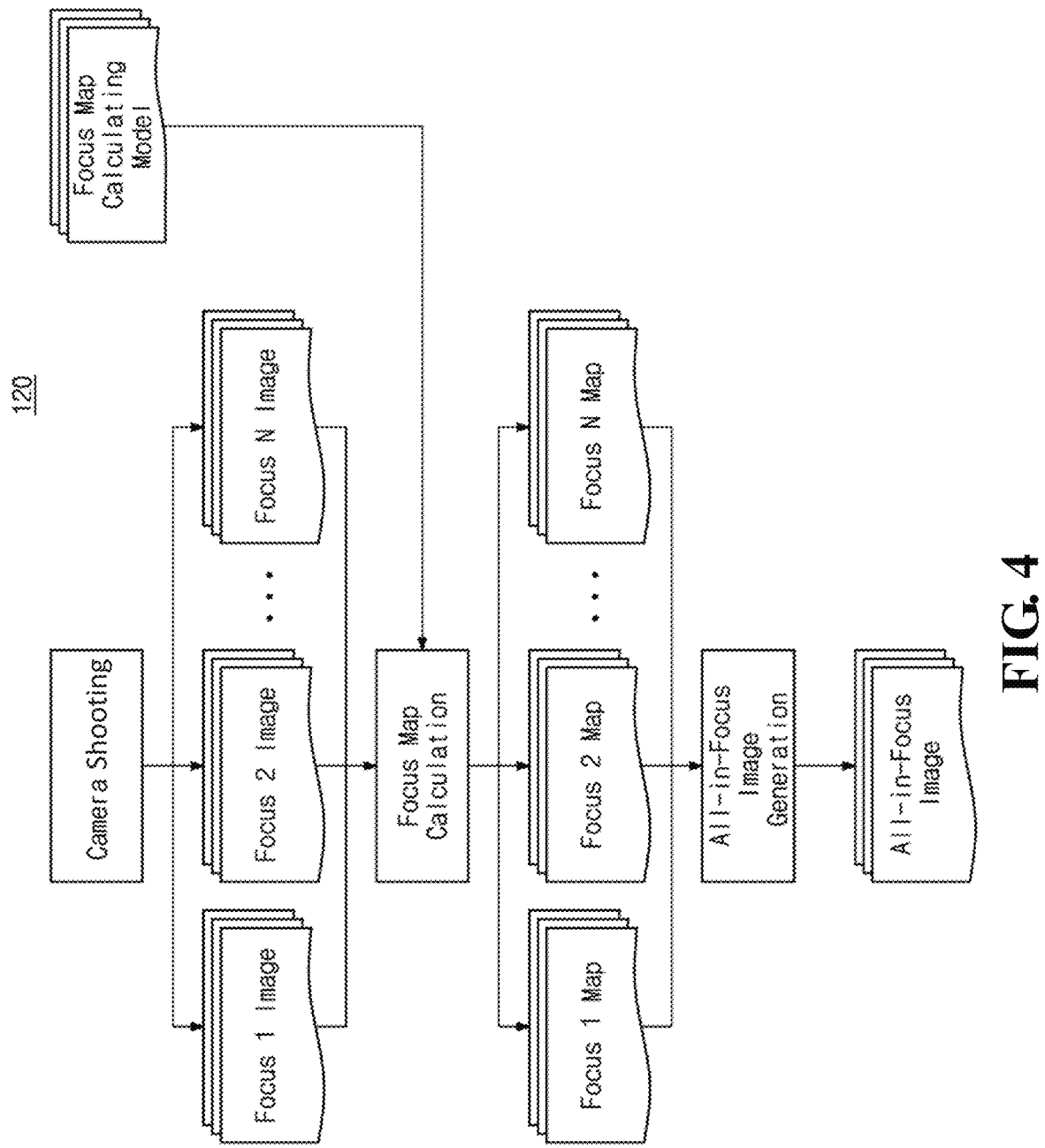
FIG. 4 is an exemplary view that shows the operation of an all-in-focus-image-generating unit according to an embodiment of the present invention.

FIG. 4 is an exemplary view that shows the operation of an all-in-focus-image-generating unit 120 according to an embodiment of the present invention. Referring to FIG. 4, the all-in-focus-image-generating unit 120 may generate a focus map for each focus image, among multi-focus images, generate a weight so as to be in proportion to a focus value based on the focus map, and calculate the final color value of a pixel using a weight average, thereby finally generating an all-in-focus image.

First, a user takes pictures at the same position by focusing a camera on various objects or depths, whereby multi-focus images may be acquired. Here, N images having different focuses are acquired, and the respective images are referred to as a focus 1 image, a focus 2 image, . . . , a focus N image. The N images having different focuses are individually calculated through the focus-map-calculating model trained in the model-learning unit 110, whereby a total of N focus maps may be generated. The N focus map values are set as weights, and the average of the weights is calculated as shown in Equation (1) for the N images having different focuses, whereby a final all-in-focus image may be generated.

Figure 5:
FIG. 5 is an exemplary view that shows one of multi-focus images acquired from a configured database according to an embodiment of the present invention, which is used in a training process.

FIG. 5 is an exemplary view that shows one of multi-focus images acquired from a configured database according to an embodiment of the present invention, which is used in a training process.

Figure 6:
FIG. 6 is an exemplary view that shows a clear reference all-in-focus image acquired from the same database.

FIG. 6 is an exemplary view that shows a clear reference all-in-focus image acquired from the same database.

Figure 7:
FIG. 7 is an exemplary view that shows a result value for an all-in-focus image, which is finally generated by applying the multi-focus image of FIG. 5 as input using a focus map model that is trained using the multi-focus image of FIG. 5 and the clear reference all-in-focus image of FIG. 6.

FIG. 7 is an exemplary view that shows a result value for an all-in-focus image, which is finally generated by applying the multi-focus image of FIG. 5 as input using a focus map model that is trained using the multi-focus image of FIG. 5 and the clear reference all-in-focus image of FIG. 6. Referring to FIG. 7, the parts that are out of focus become clear, so the image becomes similar to the clear image shown in FIG. 6.

Figure 8:
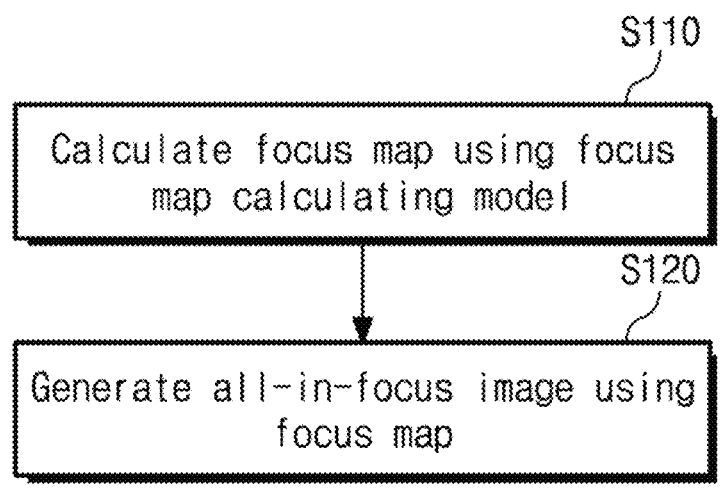
FIG. 8 is an exemplary view that shows a method for operating an apparatus for generating an all-in-focus image according to an embodiment of the present invention.

FIG. 8 is an exemplary view that shows a method for operating an apparatus 100 for generating an all-in-focus image according to an embodiment of the present invention. Referring to FIGS. 1 to 8, the apparatus 100 for generating an all-in-focus image may operate as follows.

The model-learning unit (110 in FIG. 1) may receive multi-focus images and a reference all-in-focus image corresponding thereto from a database and generate a focus-map-calculating model through deep learning (e.g., a convolutional neural network) at step S110. The all-in-focus-image-generating unit (120 in FIG. 1) may generate a clear all-in-focus image for multi-focus images, which are acquired from a plenoptic camera, using the focus-map-calculating model at step S120.

In an embodiment, the multi-focus images and the reference all-in-focus image may be read from the database. In an embodiment, a camera may include a plenoptic camera. In an embodiment, the reference all-in-focus image may be generated using images having different focuses.

In an embodiment, the focus-map-calculating model may be used to generate respective focus maps corresponding to the multiple focuses. In an embodiment, the all-in-focus image may be generated from the multi-focus images using the focus maps corresponding to the multiple focuses.

In an embodiment, the error difference between the all-in-focus image and the reference all-in-focus image may be calculated. In an embodiment, the weight of the focus-map-calculating model may be updated depending on the error difference.

In an embodiment, weights, each in proportion to a focus value, may be generated based on the respective focus maps of the multi-focus images, and the average of the respective weights of the multi-focus images may be calculated in order to acquire the color value of a pixel in the all-in-focus image.

Figure 9:
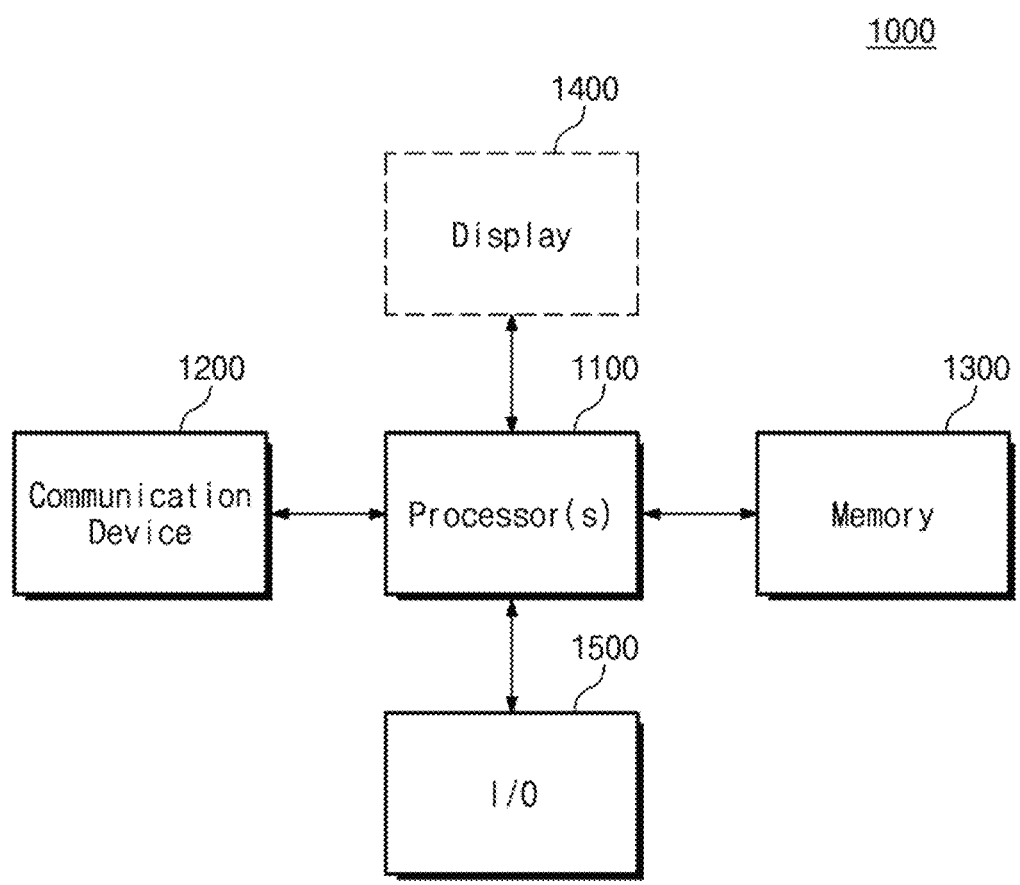
FIG. 9 is an exemplary view that shows an apparatus for generating an all-in-focus image according to an embodiment of the present invention.

FIG. 9 is an exemplary view that shows an apparatus 1000 for generating an all-in-focus image according to an embodiment of the present invention. Referring to FIG. 9, the apparatus 1000 for generating an all-in-focus image may include at least one processor 1100, a network interface 1200, memory 1300, a display 1400, and an input/output device 1500.

The processor 1100 may include at least one of the devices described with reference to FIGS. 1 to 8, or may be implemented using at least one of the methods described with reference to FIGS. 1 to 8. The processor 1100 may execute instructions so as to generate a focus-map-calculating model through deep learning and to generate a clear all-in-focus image for multi-focus images, acquired from a camera, using the focus-map-calculating model, as described above.

Also, the processor 1100 may read/write neural network data, for example, image data, feature map data, kernel data, and the like from/to the memory 1300, and may run a neural network using the read/written data. When the neural network is run, the processor 1100 may repeatedly perform a convolution operation between an input feature map and a kernel in order to generate data for an output feature map. Here, the computational amount of the convolution operation may be determined depending on various factors, such as the number of channels in the input feature map, the number of channels in the kernel, the size of the input feature map, the size of the kernel, the precision of a value, and the like.

Also, the processor 1100 may run programs and control the apparatus 1000 for generating an all-in-focus image. The apparatus 1000 for generating an all-in-focus image may be connected with an external device (e.g., a personal computer or a network) and may exchange data therewith via the I/O devices 1500. The apparatus 1000 for generating an all-in-focus image may be included in various electronic devices, including mobile devices such as a mobile phone, a smart-phone, a PDA, a tablet PC, a laptop computer, and the like, computing devices such as a PC, a tablet PC, a netbook, and the like, and electronic products such as a TV, a smart TV, a security device for gate control, and the like.

The network interface 1200 may be implemented so as to communicate with an external network using any of various wired/wireless methods.

The memory 1300 may store computer-readable instructions. The processor 1100 may perform the above-described operations by executing the instructions stored in the memory 1300. The memory 1300 may be volatile or non-volatile memory. The memory 1300 may include a storage device for storing user data. The storage device may be an embedded multimedia card (eMMC), a solid-state drive (SSD), universal flash storage (UFS), or the like. The storage device may include at least one nonvolatile memory device. The nonvolatile memory device may be any of NAND flash memory, Vertical NAND (VNAND), NOR flash memory, Resistive Random-Access Memory (RRAM), Phase-Change Memory (PRAM), Magnetoresistive Random-Access Memory (MRAM), Ferroelectric Random-Access Memory (FRAM), Spin-Transfer-Torque Random-Access Memory (STT-RAM), and the like.

The embodiments described above may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. The processing device may run an operating system (OS) and one or more software applications executed on the OS.

Also, the processing device may access, store, manipulate, process and create data in response to execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The apparatus 1000 for generating an all-in-focus image according to an embodiment of the present invention includes at least one processor 1100 and memory 1300 for storing at least one instruction executed by the at least one processor 1100. The at least one instruction may be executed by the at least one processor 1100 so as to calculate a focus map for each of multi-focus images, which are captured by a camera, using a focus-map-calculating model and to generate an all-in-focus image for the multi-focus images using the focus map.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts. Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of the embodiment, and vice-versa.

An apparatus for generating an all-in-focus image using multi-focus images according to an embodiment of the present invention may calculate a focus map by generating and training a focus map model based on a convolutional neural network of deep learning and include a database in which an image set comprising multi-focus images and a clear image corresponding thereto is configured in order to train the focus map model.

An apparatus for generating an all-in-focus image and a method for operating the same according to an embodiment of the present invention may improve the accuracy of clear-image generation using deep learning.

Meanwhile, the above description pertains merely to specific embodiments for practicing the present invention. The present invention encompasses not only concrete and available means but also the technical spirit corresponding to abstract and conceptual ideas that may be used as future technology.

What is claimed is:

1. A method for operating an apparatus for generating an all-in-focus image, comprising:
    generating a focus-map-calculating model through deep learning for images having different focuses and a reference all-in-focus image corresponding thereto;
    calculating a focus map for each of multi-focus images, using the focus-map-calculating model; and
    generating the all-in-focus image for the multi-focus images using the focus map,
    wherein the all-in-focus image is generated using an average of weights for focus map values corresponding to the multi-focus images.

2. The method of claim 1, further comprising: reading the multi-focus images and the reference all-in-focus image from a database.

3. The method of claim 1, wherein the multi-focus images are captured by a camera, the camera including a plenoptic camera.

4. The method of claim 1, wherein the reference all-in-focus image is generated using the images having the difference focuses.

5. The method of claim 1, wherein the focus-map-calculating model is used to generate respective focus maps corresponding to multiple focuses.

6. The method of claim 5, wherein generating the all-in-focus image comprises: generating the all-in-focus image from the multi-focus images using the focus maps corresponding to the multiple focuses.

7. The method of claim 1, further comprising: calculating an error difference between the all-in-focus image and the reference all-in-focus image.

8. The method of claim 7, further comprising: updating a weight of the focus-map-calculating model depending on the error difference.

9. The method of claim 1, wherein generating the all-in-focus image comprises:
    generating a weight that is proportional to a focus value based on a focus map of each of the multi-focus images; and
    calculating the average of respective weights of the multi-focus images in order to acquire a color value of a pixel in the all-in-focus image.

10. An apparatus for generating an all-in-focus image, comprising:
    at least one processor; and
    memory for storing at least one instruction to be executed by the processor,
    wherein the at least one instruction is configured to calculate a focus map for each of multi-focus images, using a focus-map-calculating model, and generate the all-in-focus image for the multi-focus images using the focus map,
    wherein the all-in-focus image is generated using an average of weights for focus map values corresponding to the multi-focus images.

11. The apparatus of claim 10, wherein the at least one instruction is executed by the at least one processor so as to generate the focus-map-calculating model through deep learning for images having different focuses and a reference all-in-focus image corresponding thereto.

12. The apparatus of claim 11, wherein the deep learning includes a convolutional neural network (CNN).

13. The apparatus of claim 11, wherein the multi-focus images are acquired in such a way that a camera at a same position captures images by focusing on various objects or depths.

14. The apparatus of claim 11, wherein the focus-map-calculating model is used to generate a focus map corresponding to each of the multi-focus images.

15. The apparatus of claim 11, wherein the focus-map-calculating model is trained such that a difference between the all-in-focus image and the reference all-in-focus image is minimized.

16. The apparatus of claim 15, wherein the deep learning is implemented by combining a convolution layer, a batch normalization layer, and an activation layer.

17. An electronic device, comprising:
    a plenoptic camera;
    a database for storing an image set comprising images having different focuses and a reference all-in-focus image corresponding thereto; and
    an all-in-focus image generation apparatus for reading the image set from the database, generating a focus-map-calculating model through deep learning for the read image set, and generating an all-in-focus image for multi-focus images, captured by the plenoptic camera, using the focus-map-calculating model, wherein the all-in-focus image is generated using an average of weights for focus map values corresponding to the multi-focus images.

18. The electronic device of claim 17, wherein the all-in-focus image generation apparatus generates a focus map for each of the multi-focus images, generates weights, each of which is proportional to a focus value, based on the generated focus map, and calculates the average of the generated weights as a color value of a pixel, thereby generating the all-in-focus image.

19. The electronic device of claim 17, wherein the all-in-focus image generation apparatus trains the focus-map-calculating model using the reference all-in-focus image and the multi-focus images corresponding to the all-in-focus image.

\* \* \* \* \*